(12) United States Patent
Choudary et al.

(10) Patent No.: US 6,709,597 B1
(45) Date of Patent: Mar. 23, 2004

(54) PROCESS FOR THE SEPARATION OF RACEMIC MIXTURES

(75) Inventors: Boyapati Manoranjan Choudary, Andhra Padeah (IN); Venkata Sri Ranganath Kalluri, Andhra Padeah (IN); Lakshmi Kantam Mannepalli, Andhra Pradeah (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/306,743

(22) Filed: Nov. 29, 2002

(51) Int. Cl.$^7$ ................................................ B01D 15/08
(52) U.S. Cl. .................... 210/635; 210/656; 210/198.2; 210/502.1
(58) Field of Search ................ 210/635, 656, 210/660, 679, 198.2, 502.1; 521/99

(56) References Cited

U.S. PATENT DOCUMENTS

| | | | | |
|---|---|---|---|---|
| 5,587,273 | A | * 12/1996 | Yan et al. | 430/269 |
| 6,057,377 | A | 5/2000 | Sasaki et al. | 521/99 |
| 6,251,280 | B1 | * 6/2001 | Dai et al. | 210/656 |
| 6,310,110 | B1 | * 10/2001 | Markowitz et al. | 521/99 |
| 6,583,191 | B2 | * 6/2003 | Markowitz et al. | 521/99 |

OTHER PUBLICATIONS

Ichinose et al. "Supramolecular Organisation and Materials Design", 2002, Cambridge University Press, Cambridge, UK, XP001153608.

Pinel et al. "Preparation and Utilization of Molecularly Imprinted Silicas", Advanced Materials, VCH Verlagsgesellschaft, Weinheim, DE, vol. 9, No. 7, Jun. 1, 1997, pp. 582–585, XP000694711.

Katz et al., "Molecular Imprinting of Bulk, Microporous Silica", Nature, vol. 403, No. 6767, 2000, pp. 286–289, XP001153604.

Markowitz et al., "Coll–179: Functionalised Silica Gel Particles for Molecular Imprinting", 1998, American Chemical Society, Washington, DC, XP009013381.

Glad et al., "Use of Silane Monomers for Molecular Imprinting and Enzyme Entrapment in Polysiloxane–Coated Prorous Silica", Journal of Chromatography, Elsevier Science Publishers B.V. Amsterdam, NL., vol. 347, 1985, pp. 11–23, XP000653144.

\* cited by examiner

*Primary Examiner*—Ernest G. Therkorn
(74) *Attorney, Agent, or Firm*—Nixon & Vanderhye P.C.

(57) ABSTRACT

The present invention relates to a process for the separation of racemic mixtures comprising development of a denser molecular imprint on silica with a desired enantiomer by sol-gel protocol.

14 Claims, No Drawings

PROCESS FOR THE SEPARATION OF RACEMIC MIXTURES

FIELD OF THE INVENTION

The present invention relates to a process for the separation of racemic mixtures comprising development of a denser molecular imprint on silica with a desired enantiomer by sol-gel protocol. More particularly, nanoporous silica with a defined shape and size is developed by molecular imprinting of the desired enantiomer for the resolution of corresponding racemic mixture. The present invention relates to the functionalized imprinted materials. More particularly, the present invention relates to amorphous silicas having discrete pores of controlled size and shape with one spatially organized functional groups formed therein.

BACKGROUND OF THE INVENTION

Reference is made to Wulf Angew, Chem.Int.Ed., 1812, 34, 1995, wherein separation of aminoacid derivatives and sugar compounds is carried out by using bulk polymer net work using functional monomers through covalent interactions. The major disadvantages are the amount of imprint used in the polymer preparation is only up to 3% of the total polymer and after the porogens (solvents) are removed, some of the structural integrity of the polymer is lost, leading to deformation of the sites.

Reference is made to Davis et al; Nature, 283, 403, 2000, wherein molecular imprinting of bulk microporous silica is carried out by covalent bonding approach using tetraethylorthosilicate as a silicon source. The major disadvantage in this process is the amount of imprint used in the sol-gel synthesis correspond to only 2 mol % of the imprint silicon relative to TEOS silicon.

Reference is made to Mosbach et al; Biotechnology 163, 1996; Journal of Chromatography 391, 470, 1989; wherein enantiomeric resolution of amino acid derivatives was carried out using polymerization of monomer with imprint molecule in the presence of crosslinking agent. The major drawback in this process is some of the structural integrity of the polymer is lost, leading to deformation of the sites. Reference is also made to Pinel et al., Advanced Materials.1997, 9, 582, wherein (−)-menthol was used as a imprint molecule using silica. The major drawbacks in this process is poor enantioselectivity.

Reference is made to U.S. Pat. No. 5,587,273 wherein molecular imprinting method is used for organic polymers, particularly allowing the manufacture of thin films on surfaces such as silicon wafers. This method has shown that some highly selective receptor sites can be built for complex molecules such as sugars, amino acids. The major drawbacks in this process is imprinted polymers lose their affinity for substrates in aqueous solutions.

OBJECTS OF THE INVENTION

The main object of the present invention is to provide a process for the separation of racemic mixtures comprising development of a denser molecular imprint on silica with a desired enantiomer by sol-gel protocol.

It is another object of the invention to develop an nanoporous silica with a defined shape and size by molecular imprinting of the desired enantiomer for the resolution of corresponding racemic mixture.

It is yet another object of the invention to provide a process for the separation of racemic mixtures comprising development of a denser molecular imprint on silica with a desired enantiomer by sol-gel protocol where the selectivity is good.

It is yet another object of the invention to provide a process for the separation of racemic mixtures wherein the use of expensive chemicals for resolution is avoided.

It is yet another object of the invention to provide a process for the separation of racemic mixtures which is environmentally safe, simple and economical.

It is a further object of the invention to provide a process for the separation of racemic mixtures where imprinted silica can be used for number of cycles with consistent selectivity.

SUMMARY OF THE INVENTION

The novelty of the present invention lies in the design and development of nanoporous silica with a defined shape and size to suit the desired enantiomer for resolution of the corresponding racemic mixture with high enantiomeric purity for the first time. The nanoporous silica is developed by sol-gel protocol, involving the hydrolytic polymerization of tetraethylorthosilicate using as a monomer and amino alkylsilane as a functional monomer in presence of desired enantiomer, capping of the surface OH groups and finally desorption of the encapsulated enantiomer, for the selective adsorption of the said enantiomer from the racemic mixture to effect resolution with high optical purity.

During the hydrolytic polymerization, the monomer of the functional silica of 3-amino alkanes form strong hydrogen bonding interactions with the —COOH group of protected amino acid and also forms hydrophobic and dipole-dipole interactions between two functional monomers or functional monomer and imprint molecule. Higher enantioselectivities are obtained when silica as synthesized is used in the resolution of amino acid derivatives and mandelic acid. The nanoporous silica thus developed possess high loading capacity to enable to adsorb desired enantiomer 3–12%. Thus the nanoporous silica gives higher through put in the resolution of racemic mixture for the first time, which is not possible with polymers. Thus earlier patents fell short of expectations for commercial reality and economics of the process. Therefore, silica as synthesized is better option in particular for the resolution of racemic compounds having functional groups. Thus, this invention offers the best techno-economic route for resolution of amino acid derivatives and for mandelic acid.

Accordingly the present invention provides a process for the separation of racemic mixtures comprising developing a denser molecular imprint on silica with a desired enantiomer by sol-gel protocol, said sol-gel protocol comprising hydrolytic control polymerization of a silica source as the monomer and amino alkylsilane as a functional monomer in the presence of the desired enantiomer, capping of surface OH groups and desorption of encapsulated enantiomer from the silica, for the selective adsorption of 3–12% of the said enantiomer from the racemic mixture to effect resolution with high optical purity.

In one embodiment of the invention, the alkyl group in the amino alkyl silane is selected from the group consisting of ethyl, propyl and butyl.

In another embodiment of the invention the silica used is a nanoporous silica designed and developed with the defined shape and size to suit the desired enantiomer for resolution of the corresponding racemic mixture.

In another embodiment of the invention, the silica source used is tetraethylorthosilicate (TEOS).

In another embodiment of the invention, the functional monomer comprises 3-amino alkyl triethoxysilane.

In yet another embodiment of the invention, the alkyl is selected from the group consisting of ethyl, propyl, and butyl.

In another embodiment of the invention the imprinted silica used for resolution is recycled for number of times.

In another embodiment of the invention the ratio of imprint to the functional monomer molecule is from 1:2 to 1:5.

In an embodiment of the invention the enantiomeric imprints used comprises Cbz protected (L)-alanine, (L)-phenylalanine and (L)-glutamic acid, and 1-mandelic acid.

In another embodiment of the invention the percentage of imprint molecule to TEOS used is from 2% to 10%.

In yet another embodiment of the invention, the solvent used for controlled hydrolysis is distilled water.

In still another embodiment of the invention the capping of surface-OH group is carried out with an equimolar mixture of 1,1,1,3,3,3-hexamethyldisilazane arid chlorotrimethyl silane.

DETAILED DESCRIPTION OF THE INVENTION

The present invention applies the principles of enzyme specificity and catalysis in a non-biological context. In the most general terms, the present invention relates to the development of amorphous inorganic materials having discrete voids of controlled sized and shape that are akin to enzymatic active sites. The size and shape of the voids are readily varied and are typically complementary to the desired substrate (depend on desired enantiomer molecule). One or more spatially organized functional groups are positioned in a defined three dimensional relationship within each void and with respect to each other such that the imprinted material contains a plurality of substantially similar functionalized void spaces. By varying both the positions and identities of the one or more functional groups, diverse sets of substrate specific adsorbents and non-biologically-based catalysts are created.

The novelty of the present invention lies in the design and development of nanoporous silica with the defined shape and size to suit the desired enantiomer for resolution of the corresponding racemic mixture with high enantiomeric purity for the first time. The nanoporous silica is developed by sol-gel protocol, involving the hydrolytic polymerization of tetraethylorthosilicate using as a monomer and amino alkylsilane as a functional monomer in presence of desired enantiomer, capping of the surface OH groups and finally desorption of the encapsulated enantiomer, for the selective adsorption of the said enantiomer from the racemic mixture to effect resolution with high optical purity.

During the hydrolytic polymerization, the monomer of the functional silica of 3-amino alkanes form strong hydrogen bonding interactions with the —COOH group of protected amino acid and also forms hydrophobic and dipole-dipole interactions between two functional monomers or functional monomer and imprint molecule. Higher enantioselectivities are obtained when silica as synthesized is used in the resolution of amino acid derivatives and mandelic acid. The nanoporous silica thus developed possess high loading capacity to enable to adsorb desired enantiomer 3–12%. Thus the nanoporous silica gives higher through put in the resolution of racemic mixture for the first time, which is not possible with polymers. Thus earlier patents fell short of expectations for commercial reality and economics of the process. Therefore, silica as synthesized is better option in particular for the resolution of racemic compounds having functional groups. Thus, this invention offers the best techno-economic route for resolution of amino acid derivatives and for mandelic acid.

As explained above, the source of silica used is preferably tetraethylorthosilicate ("TEOS") monomer and the functional monomer is preferably 3-amino alkyl triethoxysilane, where the alkyl is selected from ethyl, propyl and butyl. Preferably, the ratio of imprint to the functional monomer molecule is from 1:2 to 1:5. The imprinted silica used for resolution of racemic mixture can be recycled for number of cycles.

The enantiomeric imprints used are Cbz protected (L)-alanine, (L)-phenylalanine and (L)-glutamic acid, 1-mandelic acid etc. The percentage of imprint molecule to TEOS used is from 2% to 10%. The solvent used for controlled hydrolysis is preferably distilled water while the capping of the surface —OH group is with equimolar mixture of 1,1,1,3,3,3-hexamethyldisilazane and chlorotrimethyl silane.

The following examples are given by way of illustration of the present invention and therefore should not be construed to limit the scope of the invention.

EXAMPLE 1 a) Cbz-protected (L)-Alanine as a Print Molecule:

3.77 g of Cbz-protected (L)-alanine and 6.558 g of 3-aminopropyltriethoxysilane were taken in a 500 ml beaker containing 100 nm of absolute ethanol and stirred at room temperature for 48 h. to allow strong acid-amine hydrogen bonding interactions.

b) Synthesis of Imprinted Silica Gel:

All imprinted materials were synthesized according to the following protocol. The amount of the imprint compound used in the synthesis corresponds to about 6 mol % of imprint Si relative to the source of silica, Tetraethylorthosilicate ("TEOS").

In a typical procedure, To the 1.0 lit beaker containing acid-amine mixture (1.31 g in 100 ml ethanol) 70 ml of dry ethanol (Total ethanol quantity is 170 ml), 23.0 ml of TEOS was added to this mixture and 3.0 ml of 2-propanol was added to this mixture. Finally 61 ml of pH 2.0 aqueous HCl were added to the gel mixture. The mixture was covered loosely with a jar cap and stirred for 12 hours at 0° C. It was then covered with wax paper and stirred for 6 hours at 8° C. and for 6 hours at 15° C. and five days at room temperature. With approximately ¾ of an inch liquid head remaining in the jar after this period, the mixture was transferred to a 40° C. oven and covered loosely with a jar cap. The mixture was aged in the oven for four days and at 80° C. for two days after which time gelation had occurred and the caps were removed. The resulting glass monoliths were further aged in the oven for a period of two days. The obtained silica gel was washed thoroughly with methanol. The as-made imprinted silica monoliths were ground into a powder of, a mortar and pestle. The resulting powder was dried under ambient conditions and Soxhlet extracted with acetonitrile refluxing in calcium hydride for a period of 24 hours to remove water and ethanol from the pores of amorphous silica. The amorphous silica was then separately washed with 25 ml/g of silica with chloroform and pentane and allowed to dry.

c) Capping the Surface of Silica:

Capping OH-defect sites on the surface with an equimolar mixture of 1,1,1,3,3,3-hexamethyldisilazane and chlorotrimethylsilane at room temperature for 24 hours ("capped material") further processed the extracted material.

d) Removal of the Imprint Molecule:

Typical weight increase before/after the capping procedure is approximately 3–5 weight %. Subsequent to the capping procedure, the silica was washed with 50 ml/g of silica with anhydrous THF, anhydrous acetonitrile, chloroform, and pentane, and allowed to dry in a desiccator under ambient conditions. The washed and capped material is then ready for imprint removal.

The capped silica (2.00 g) was taken in 100 ml round-bottomed flask containing methanol (50 ml). To this 1M solution of 6 ml of $NaHCO_3$ solution was added and refluxed for 24 h. The reaction mixture was filtered off to separate the silica and washed with water and methanol respectively. The resultant silica gel was Soxhlet extracted with methanol for 36 h to get the complete removal of print molecule from silica. After that it was washed with chloroform, acetonitrile and dry THF.

e) 2.0 g of silica was taken in 50 ml of round-bottomed flask containing 20 ml-of ethanol. To this 0.12 gm of CBZ-protected D, L-alanine was added and stirring continued. After 12 h 90% of (L)-alanine derivative was in equilibrium with the imprinted silica and analyzed by chiral HPLC.

EXAMPLE 2

Cbz-protected (L)-phenylalanine as a print molecule:

The imprinted silica was prepared in the same manner as in example 1 using Cbz-protected (L)-phenylalanine as a print molecule. 2.0 g of silica was taken in 50 ml of round-bottomed flask containing 20 ml of ethanol. To this 0.12 gm of Cbz-protected D, L-phenylalanine was added and stirring continued. After 12 h 70% of (L)-Phenyl alanine derivative was in equilibrium with the imprinted silica and analyzed by chiral HPLC.

EXAMPLE 3

Cbz-protected L-Glutamic acid as a print molecule:

The imprinting silica was prepared in the same manner as in example 1, using Cbz-protected (L)-Glutamic acid as a print molecule. 2.0 g of silica was taken in 50 ml of round-bottomed flask containing 20 ml of ethanol. To this 0.12 gm of Cbz-protected D, L-Glutamic acid was added and stirring continued. After 12 h 63% of (L)-Glutamic acid derivative was in equilibrium with the imprinted silica and analyzed by chiral HPLC.

EXAMPLE 4

1-mandelic acid as a print molecule:

The imprinting silica was prepared in the same manner as in example 1, using 1-mandelic acid as a print molecule. 2.0 g of silica was taken in 50 ml of round-bottomed flask containing 20 ml of ethanol. To this 0.12 gm of d,l mandelic acid was added and stirring continued. After 12 h 90% of 1-mandelic acid was in equilibrium with the imprinted silica and analyzed by chiral HPLC.

The Main Advantages of the Present Invention are:

1. A novel process for the resolution of racemic compounds using nanoporous imprinted silica.
2. Cheaply and readily available tetraethylorthosilicate is used as the silicon source for the preparation of imprinted silica.
3. The selectivities are good and comparable with conventional methods
4. The present process dispenses the use of expensive chemicals for resolution
5. The present process is environmentally safe since there is no disposal problem.
6. The imprinted silica can be used for number of cycles with consistent selectivity.
7. The process is simple, clean and neat
8. The process is economical since it is having high imprint loading.

We claim:

1. A process for the separation of racemic mixtures comprising developing a denser molecular imprint on silica with a desired enantiomer by sol-gel protocol, said sol-gel protocol comprising hydrolytic control polymerization of a silica source as the monomer and amino alkylsilane as a functional monomer in the presence of the desired enantiomer, capping of surface OH groups and desorption of encapsulated enantiomer from the silica, for the selective adsorption of 3–12% of the said enantiomer from the racemic mixture to effect resolution with high optical purity.

2. A process as claimed in claim 1 wherein the silica used is a nanoporous silica designed and developed with the defined shape and size to suit the desired enantiomer for resolution of the corresponding racemic mixture.

3. A process as claimed in claim 1 wherein the silica source used is tetraethylorthosilicate.

4. A process as claimed in claim 1 wherein the functional monomer comprises 3-amino alkyl triethoxysilane.

5. A process as claimed in claim 4 wherein the alkyl is selected from the group consisting of ethyl, propyl and butyl.

6. A process as claimed in claim 1 wherein the imprinted silica used for resolution is recycled for number of times.

7. A process as claimed in claim 1 wherein the ratio of imprint to the functional monomer molecule is from 1:2 to 1:5.

8. A process as claimed in claim 1 wherein the enantiomeric imprints used comprises Cbz protected (L)-alanine, (L)-phenylalanine and (L)-glutamic acid, and 1-mandelic acid.

9. A process as claimed in claim 1 wherein the percentage of imprint molecule to TEOS is from 2% to 10%.

10. A process as claimed in claim 1 wherein the solvent used for controlled hydrolysis is distilled water.

11. A process as claimed in claim 1 wherein capping of surface-OH group is carried out with an equimolar mixture of 1,1,1,3,3,3-hexamethyldisilazane and chlorotrimethyl silane.

12. A process as claimed in claim 1 wherein the source of silica used is tetraethylorthosilicate ("TEOS") and 3-amino alkyl triethoxysilane as a functional monomer.

13. A process as claimed in claim 12 wherein the alkyl is selected from ethyl, propyl and butyl.

14. A process as claimed in claim 1 wherein the controlled hydrolysis is carried out from 0° C. to 80° C.

* * * * *